(12) United States Patent
Kosugi et al.

(10) Patent No.: US 8,105,426 B2
(45) Date of Patent: Jan. 31, 2012

(54) CANISTERS

(75) Inventors: Ryuji Kosugi, Obu (JP); Masataka Suzuki, Obu (JP); Kenji Seki, Higashiosaka (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 366 days.

(21) Appl. No.: 12/471,516

(22) Filed: May 26, 2009

(65) Prior Publication Data

US 2009/0293728 A1 Dec. 3, 2009

(30) Foreign Application Priority Data

May 27, 2008 (JP) ................................. 2008-137449

(51) Int. Cl.
*B01D 53/04* (2006.01)
*F02M 33/04* (2006.01)
(52) U.S. Cl. .......................................... 96/153; 123/519
(58) Field of Classification Search .................... 96/108, 96/126, 146, 147, 153; 123/519; 165/10
See application file for complete search history.

(56) References Cited

U.S. PATENT DOCUMENTS

| | | | | |
|---|---|---|---|---|
| 5,861,050 A | * | 1/1999 | Pittel et al. ...................... | 95/115 |
| 7,543,574 B2 | * | 6/2009 | Yamazaki et al. ............ | 123/519 |
| 7,615,108 B2 | * | 11/2009 | Yoshida et al. ................. | 96/108 |
| 7,922,797 B2 | * | 4/2011 | Kosugi et al. ................... | 96/147 |
| 2005/0223900 A1 | * | 10/2005 | Yoshida et al. ................. | 96/108 |
| 2006/0196480 A1 | * | 9/2006 | Kosugi et al. .................. | 123/516 |
| 2009/0294094 A1 | * | 12/2009 | Suzuki et al. ................... | 165/10 |
| 2010/0147152 A1 | * | 6/2010 | Kosugi ............................ | 96/146 |
| 2011/0036537 A1 | * | 2/2011 | Seki ................................ | 165/10 |

FOREIGN PATENT DOCUMENTS

| | | |
|---|---|---|
| JP | 2005233106 | 9/2005 |
| JP | 2006233962 | 9/2006 |

OTHER PUBLICATIONS

Internet document "CPLab Safety; Chemical Resistance Summary: Classes of Substances at 20° C." http://www.calpaclab.com/pages/chart.html, 2011.*

* cited by examiner

*Primary Examiner* — Frank Lawrence, Jr.
(74) *Attorney, Agent, or Firm* — Dennison, Schultz & MacDonald

(57) ABSTRACT

The present invention includes a canister having a housing for receiving therein an adsorption material and a heat storage material. The adsorption material can adsorb a fuel vapor. The heat storage material can absorb and dissipate a heat in response to change in temperature within the housing. The heat storage material includes a plurality of heat storage granules each having a cover layer made of an alcohol resistance material.

16 Claims, 5 Drawing Sheets

CANISTERS

This application claims priority to Japanese patent application serial number 2008-137449, the contents of which are incorporated herein by reference.

BACKGROUND OF THE INVENTION

1. Field of the Invention

The present invention relates to canisters and, in particular, to canisters that have both of an adsorption material and a heat storage material.

2. Description of the Related Art

Typically, this kind of canister is disposed at a midpoint of a path communicating between a fuel tank of a vehicle and an outside of the fuel tank. When the vehicle is stopped, fuel vapor produced within the fuel tank is introduced into the canister, where a fuel component, such as butane, is removed (adsorbed) from the fuel vapor, and the remaining air component (oxygen and nitrogen) having a relatively small molecular diameter is discharged to the outside. The adsorbed fuel component can be desorbed by the flow of the outside air that is introduced into the canister during driving of the vehicle and the desorbed fuel component may then be purged into a vehicle engine.

An adsorption material, such as activated carbon, is disposed within the canister. The adsorption material may have properties of adsorbing a fuel component by an exothermic reaction and desorbing the fuel component by an endothermic reaction. Therefore, as the temperature of the canister increases due to adsorption of the fuel vapor, the adsorption performance of the canister (i.e., an adsorption ability of the adsorption material) may be lowered. On the other hand, as the temperature of the canister decreases due to desorption of the fuel vapor, the desorption performance of the canister (i.e., a desorption ability of the adsorption material) may be lowered.

Japanese Laid-Open Patent Publication No. 2005-233106 has proposed a canister having a heat storage material contained within the canister in addition to an adsorption material. Therefore, temperature variation that may be caused due to absorption and dissipation of heat by the adsorption material may be adjusted by the heat storage material, so that the adsorption and desorption performances can be properly maintained. The heat storage material is in forms of granules that are formed by granulating a mixture of a plurality of capsules and a binder. Each of the capsules is made of a melamine resin and sealingly contains a phase change material (such as n-eicosane) that can absorb or dissipate latent heat in response to the temperature within the canister. It may be preferable that the phase change material can rapidly change its phase in response to change in temperature within the canister. Therefore, typically, a granulation process of the capsules is performed by using a minimum amount of the binder in order to prevent the capsules from being covered by the binder. (More specifically, spaces or voids are provided between the capsules for exposing the capsules.)

In recent years, as alternative fuel of gasoline, alcohol-containing fuel (such as ethanol-containing fuel) has been used in various vehicles. Also in the case of using such alternative, it may be still appropriate to provide a canister at a midpoint of a path for discharging fuel vapor (alcohol vapor) to the outside. However, if the canister disclosed in the above Publication No. 2005-233106 is used for this purpose, the adsorption and desorption performances may be extremely lowered in some cases.

The inventors of the present invention devoted to prove the cause of reduction in performance of the canister and found that a main reason of reduction in performance is that alcoholic vapor enters the heat storage material (the exposed capsules) to cause the phase change material to flow out of the heat storage material.

Therefore, there is a need in the art for canisters having a heat storage material that can prevent or minimize outflow of a phase change material from the heat storage material, which may be caused by alcoholic vapor.

SUMMARY OF THE INVENTION

One aspect according to the present invention includes a canister having a housing for receiving therein an adsorption material and a heat storage material. The adsorption material can adsorb fuel vapor. The heat storage material can absorb and dissipate heat in response to change in temperature within the housing. The heat storage material includes a plurality of heat storage granules each having a cover layer made of an alcohol resistance material.

DETAILED DESCRIPTION OF THE INVENTION

Figure 1:
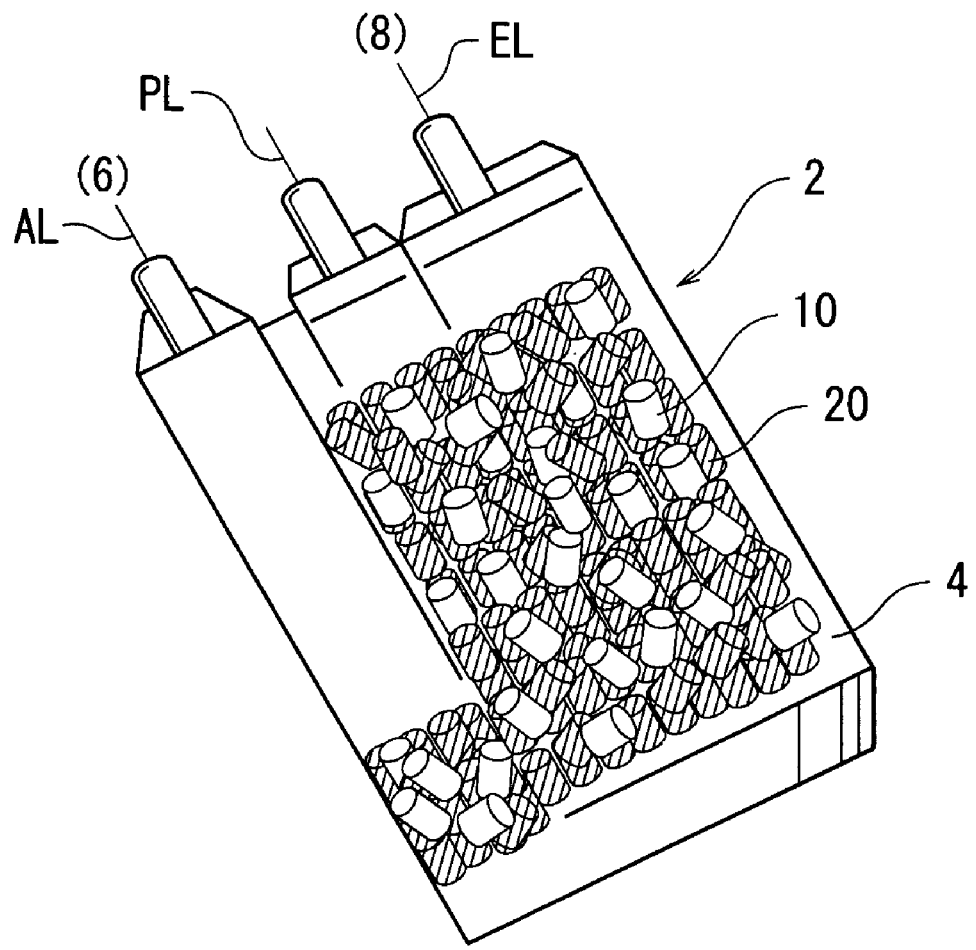
FIG. 1 is a perspective view of a canister according to an embodiment of the present invention and showing an adsorption material and a heat storage material disposed within the canister.

Each of the additional features and teachings disclosed above and below may be utilized separately or in conjunction with other features and teachings to provide improved canisters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

An embodiment of the present invention will now be described with reference to FIGS. 1 to 4. For the purpose of illustration, in the drawings, reference numerals are labeled to only one of heat storage granules (constituting a heat storage material) and only one adsorption granules (constituting an adsorption material). Similarly, a reference numeral is labeled to only one of capsules in FIGS. 2(a) to 2(c).

Referring to FIG. 1, there is shown a canister 2 that can be suitably used for a vehicle, such as an automobile (not shown), that runs on alcohol-containing fuel. The canister 2 is disposed at a midpoint of a path communicating between a fuel tank (8) and an outside (6) of the fuel tank (8).

Referring to FIG. 1 and FIGS. 2(*a*) to 2(*c*), the canister 2 has a substantially rectangular parallelepiped box-like housing 4. An adsorption material 10 and a heat storage material 20 are disposed within the housing 4. The heat storage material 20 sealingly contains a phase change material 22. In this embodiment, the adsorption material 10 is in forms of a number of pellets or granules (hereinafter also called "adsorption granules 10" using the same reference numeral as the adsorption material). Each of the adsorption granules 10 has a cylindrical configuration and may be made of activated carbon or any other suitable material that can adsorb and desorb fuel content, such as butane, contained in fuel vapor.

The housing 4 is formed with an atmospheric line AL communicating with the outside (6), an evaporation line EL communicating with the fuel tank (8), and a purge line PL for purging the fuel (desorbed from the adsorption material 10) into a vehicle engine (not shown). As will be explained later, the fuel vapor (alcoholic vapor) may flow into the canister 2 via the evaporation line EL. According to this embodiment, alcohol resistance cover layers 28 that will be explained later are used in order to prevent or minimize outflow of the phase change material 22 from the heat storage material 20, which may be caused by the alcoholic vapor.

Heat Storage Material

The heat storage material 20 of this embodiment is in forms of a number of granules (hereinafter also called "heat storage granules 20" using the same reference numeral as the heat storage material) each having a granule body 26 and the alcohol resistance cover layer 28 covering the granule body 26. The granule body 26 includes therein a number of capsules 24 each containing the phase change material 22. The capsules 24 are formed into the granule body 26 by a granulation process. Practically, the granulation process of the capsules 24 forms a number of granule bodies 26.

Phase Change Material

The phase change material 22 can absorb and dissipate latent heat in response to change in temperature and may be made of any suitable material (such as organic compound and inorganic compound) having a melting point of 10° C. to 80° C. More specifically, organic compound used for the phase-change material 22 may be selected from a group consisting of linear aliphatic hydrocarbon including tetradecane, pentadecane, hexadecane, heptadecane, octadecane, nonadecane, eicosane, henicosane, docosane; natural wax; petroleum wax; higher alcohol having a carbon number of 12 to 15; and ester including methyl palmitate and methyl stearate. Inorganic compound used for the phase change material 22 may be inorganic compound hydrate selected from a group consisting of $LiNO_3$-$3H_2O$, $Na_2SO_4$-$10H_2O$ and $Na_2HPO_4$-$12H_2O$. Further, the phase change material 22 may be a mixture of two or more of the compounds listed above as examples of the organic compound and/or the compounds listed above as examples of the inorganic compound. Among these compounds or their mixture, one having a melting point of about 20° C. or less is preferable. However, for example, although hexiadecane has a melting point of 18° C., this compound may easily flow out of the capsule 24 by the action of alcoholic vapor because its molecular size is relatively small.

Capsules

Each of the capsules 24 contains the phase change material 22 as a core material. The capsules 24 may be manufactured to have hollow spherical configurations (see FIG. 2(*a*)) by a coacervation method, an interface reaction method or any other known methods. An outer shell 25 of the capsule 24 may be made of a material selected from a group consisting of melamine resin, styrene resin, polyorganosiloxane, and gelatin or a mixture of two or more of these materials.

As the material of the outer shell, melamine resin is most preferable. The melamine resin may be produced by a condensation reaction between formaldehyde and melamine under an alkali condition to obtain methylolmelamine and by a polycondensation process of the obtained methylolmelamine. Methylolmelamine can be easily cross-liked to have a three-dimensional network structure by suitably setting the temperature during the polycondensation process. In other words, the degree of cross-linking of methylolmelamine can be easily increased. By forming the outer shell 25 by the melamine resin (having a three-dimensional network structure), the phase change material 22 can be reliably sealingly contained within the outer shell 25.

Preferably, the diameter of the capsules 24 may be an order of between a few μm and a few tens μm. If the diameter of the capsules 24 is too small, the proportion of the outer shell in the capsule 24 increases and the proportion of the phase change material 22 that is repeatedly melted and solidified (changes in phase) decreases to lower the heat storage capacity per unit volume of the heat storage material 20. On the contrary, if the diameter of the capsules 24 is tool large, the proportion of the outer shell in the capsule 24 must be increased in order to ensure the strength of the capsule 24, and therefore, the proportion of the phase change material 22 decreases to lower the heat storage capacity per unit volume of the heat storage material 20.

Granule Bodies

A mixture of a plurality of capsules 24 and a binder is granulated under pressure to form a plurality of granule bodies 26 having a desired shape and size (see FIG. 2(*a*)). As a material of the binder, phenol resin is preferable in view of stability and strength required for the canister 2 against the temperature change and against solvent.

The granulation process for forming the granule bodies 26 is preferably performed by using a minimum amount of the binder to prevent the capsules 24 from being completely covered by the binder. With this, a small gap may be formed between two adjacent capsules 24 to expose the capsules 24 to the outside. In other words, the granule body 26 has a porous structure. Although not shown in FIGS. 2(*b*) and 2(*c*), the binder is positioned between the capsules 24 to join them each other.

The amount of addition of the binder may be within a range of between 1 to 10% by weight of the total weight of the capsules 24. If the amount of the binder is less than 1% by weight, a force for joining the capsules 24 may be weakened, so that the stability in shape of the granule body 26 may be lowered to cause difficulty in maintaining the granule body 26 to have a desired shape. On the contrary, if the amount of the binder is more than 10% by weight, it is likely that the capsules 24 are entirely covered by the binder. By setting the amount of the binder to a range of between 1 to 3% by weight of the total weight of the capsules 24, the capsules 24 may be reliably joined to each other and the granule body 26 may have a suitable porous structure.

The external configuration and the size of the heat storage granules 20 may be determined based on the external configuration and the size of the granule bodies 26. Preferably, the granule bodies 26 may have a diameter of between a few hundred μm and a few mm. By using the granule bodies 26 and by using a mixture of the heat storage granules 20 each including the granule body 26 and the adsorption granules 10, it is possible to ensure a sufficient heat storage capacity and to prevent separation between the heat storage material 20 and the adsorption material 10 when vibrations are applied. In addition, because suitable spaces or voids can be ensured between the adsorption granules 10 and the heat storage granules 20, the adsorption material 10 can reliably perform its adsorption and desorption functions, and additionally, it is possible to minimize loss of pressure within the canister 2. Furthermore, because the surface of the adsorption material 10 is not covered by the heat storage material 20, it is possible to avoid an adverse effect, such as reduction in the adsorption speed.

The granule bodies 26 (heat storage material 20) may have various configurations, such as spherical, cylindrical, and polygonal column-like configurations. Preferably, the granule bodies 26 (the heat storage granules 20) may have a cylindrical configuration or a pellet-like configuration having a diameter of between 1 mm and 3 mm and a length of between 1 mm and 5 mm. In this embodiment, the adsorption granules 10 also have a cylindrical configuration having substantially the same diameter and substantially the same length as the granule bodies 26 or the heat storage granules 20. The granule bodies 26 having the cylindrical configuration can be obtained by forming the heat storage material 20 (mixture of the capsules 24 and the binder) into a linear shape by an extrusion molding process and thereafter cutting the same.

PVA Intermediate Layer

Preferably, an intermediate layer made of polyvinyl alcohol may then be formed on the outer surface of each of the granule bodies 26. Thus, the intermediate layer is formed prior to forming the cover layer 28 on each of the granule bodies 26. The cover layer 28 may be made of alcohol resistance resin as will be explained later. The intermediate layer can improve the adherability of the cover layer 28 to the granule body 26.

Cover Layer

Figure 2A:
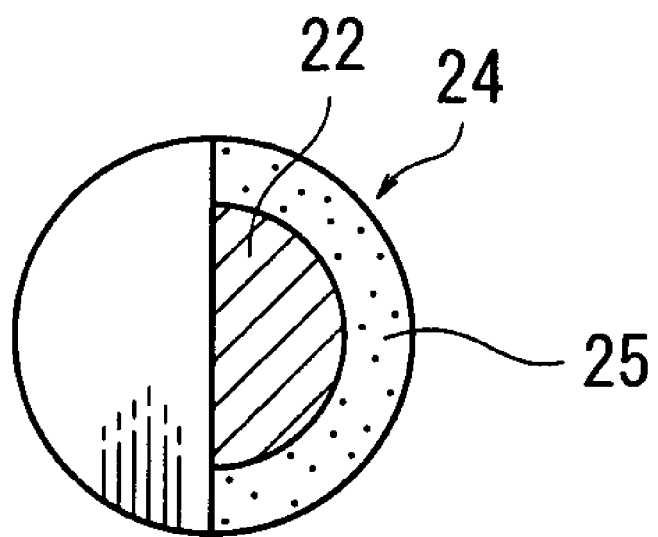
FIG. 2(a) is a half sectional view of one of capsules of the heat storage material.
Figure 2B:
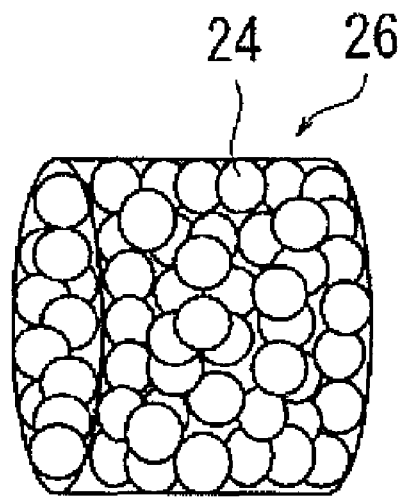
FIG. 2(b) is a perspective view of the capsule.
Figure 2C:
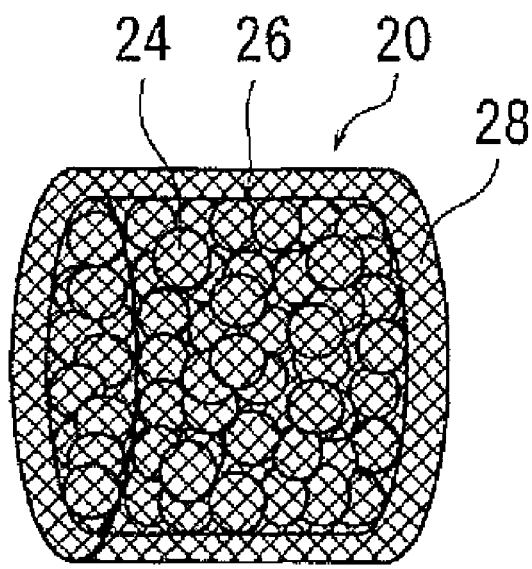
FIG. 2(c) is a view showing an internal structure of one of heat storage granules.

As shown in FIG. 2(c), the cover layer 28 made of alcohol resistance resin is formed on each of the granule bodies 26 after forming the intermediate layers thereon. The cover layer 28 may be formed on each of the granule bodies 26 by applying a solution of alcohol resistance resin by way of spraying, coating, impregnating (dipping) or any other suitable techniques. Among these techniques, a technique of spraying the solution under reduced (vacuum) pressure is most preferable, because this method enables to form the cover layer 28 to have a substantially uniform thickness on the granule body 26.

As the alcohol resistance resin, phenol resin (PF) is preferably used, because phenol resin has good resistance against alcohol and also has good resistance against acid.

The alcohol resistance resin is applied within a range of between 1 and 10% by weight of the total weight of the granule bodies 26. If the alcohol resistance resin is less than 1% by weight, the alcohol resistance property of the heat storage material 20 may be insufficient. On the contrary, if the alcohol resistance resin is more than 10% by weight, the heat storage capacity of the heat storage material may become inadmissibly smaller. By setting the amount of the alcohol resistance resin within a range of between 1 and 10% by weight, a sufficient alcohol resistance property can be ensured and the heat storage capacity may not be inadmissibly reduced.

The thickness of the cover layer 28 of the alcohol resistance resin may be within a range of between 0.5 µm and 15 µm. With this setting of the thickness, it is possible to optimally prevent alcohol vapor from entering the granule bodies 26. There may be a tendency that the durability of the cover layer 28 is extremely lowered to cause alcohol vapor to enter the granule bodies 26 during the long time use if the thickness is less than 0.5 µm. On the other hand, if the thickness is larger than 15 µm, the conductivity of heat from the adsorption material 10 (heat storage ability) may be somewhat lowered.

If the thickness is set within a range of between 0.5 µm and 15 µm, durability sufficient for enabling a long time use can be given and the conductively of heat from the adsorption material 10 (heat storage ability) can be ensured to be optimum, so that the cover layer 28 may have substantially the same heat conductivity as the granule body 26. Therefore, the heat storage material 20 can be also optimally used for gasoline fuel that contains no substantial alcohol content.

By constituting the heat storage material 20 with the granule bodies 26 covered by the alcohol resistance cover layers 28 (i.e., with the granule bodies 26 shielded by the cover layers 28), the phase change material 22 can be reliably held within the heat storage material 20 even in the event that alcohol vapor enters within the canister 2 (see FIG. 1).

Canister

The heat storage material 20 and the adsorption material 10 described above are then filled into the housing 4 to form the canister 2 (see FIG. 1). The proportions of the heat storage material 20 and the adsorption material 10 may typically be determined such that the heat storage material 20 is 5 to 40% by weight, preferably 10 to 35% by weight, of the total weight of the heat storage material 20 and the adsorption material 10. If the proportion of the heat storage material 20 is too small, its heat storage function may be insufficient for inhibiting change in temperature. If the proportion of the heat storage material 20 is too large, the proportion of the adsorption material 10 decreases to lower the amount of adsorption per unit volume capable by the canister 2.

Here, the weight per unit volume (filled volume) of each of the heat storage material 20 and the adsorption material 10 may preferably be determined within a range of between 0.1 g/cc and 1.5 g/cc, preferably between 0.2 g/cc and 0.6 g/cc. Further, the filled volume of the heat storage material 20 is preferably 0.3 to 3 times, more preferably 0.5 to 2 times, of the filled volume of the adsorption material 10. If the difference between the filled volumes of the heat storage material 20 and the adsorption material 10 is tool large, the heat storage material 20 and the adsorption material 10 may tend to be separated from each other. Thus, in the case that the canister 2 is installed on a vehicle and vibrations are applied to the canister 2, the heat storage material 20 or the adsorption material 10 having a larger filled volume may tend to move downward than the other.

Referring to FIG. 1, during stopping of the vehicle, fuel vapor (alcohol vapor) may flow from the fuel tank (8) into the canister 2 via the evaporation line EL. The fuel content, such as butane, of the fuel vapor may be removed (adsorbed) by the adsorption material 10 contained within the canister 2, and the air content having a relatively small molecular diameter may be discharged to the outside (6) via the atmospheric line AL. During this operation, because the heat storage granules 20 (heat storage material 20) contained within the canister 2 are covered by the cover layers 28 made of alcohol resistance resin, it is possible to prevent or minimize the phase change material 22 from being flown out of the heat storage material 20. Therefore, according to the canister 2 of this embodiment, the temperature within the canister 2 can be suitably maintained by the function of the heat storage material 20 even on the condition that alcohol vapor enters within the canister 2. As a result, the adsorption function can be effectively performed.

During the driving operation of the vehicle, outside air is introduced into the canister 2 via the atmospheric line AL, so that the fuel is desorbed from the adsorption material 10 and is then purged into the vehicle engine via the purge line PL. According to the canister 2 of this embodiment, the phase change material 22 is optimally held within the heat storage granule 20 (the heat storage material 20), and therefore, the temperature of the canister 2 can be suitable maintained, so that the desorption function can be effectively performed.

As described above, according to the canister 2 of this embodiment, it is possible to prevent or minimize the phase change material 22 from flowing out of the heat storage material 20 even in the event that alcohol vapor enters the canister 2. Therefore, the canister 2 can be broadly used for various kinds of fuels including alcohol-containing fuel.

TEST EXAMPLE

The embodiment of the present invention will be further described according to a test example that should be considered to be a non-restrictive example.

Heat Storage Material of Example 1

First, an initial melamine-formaldehyde condensation product solution was prepared by adding 6.5 g of 37% formaldehyde water solution and 10 g of water to 5 g of melamine powder, adjusting pH of the mixture to 8, and thereafter heating the mixture to 70° C. A mixed liquid was prepared by dissolving 80 g of hexadecane (phase change material) into 100 g of a sodium salt water solution of styrene anhydride copolymer adjusted to have a pH of 4.5. The mixed liquid was then added to the initial melamine-formaldehyde condensation product solution and was mixed therewith for emulsification while being strongly agitated. The pH of the emulsified mixture was adjusted to 9, so that an encapsulation process is completed. The emulsified mixture was then dried to remove unnecessary solutions to obtain a number of capsules each having hexadecane covered by an outer shell made of melamine resin. As a binder, 4% by weight of phenol resin was added to the capsules and mixed therewith. The mixture was then extruded in a continuous cylindrical shape and was thereafter cut and dried to obtain granules (cylindrical granules) each having a diameter of about 2 mm and a length of about 3 mm. Thereafter, 3% by weight of phenol resin is applied to the granules by way of a rotary spray under reduced pressure (application condition: 100° C. in temperature, 1 h of spraying period, and 30 rpm of rotational speed of rotary spray). With this process, the granules were covered by phenol resin cover layers serving as alcohol resistance layers, so that a heat storage material of Example 1 according to the present invention was obtained (see FIG. 2(c)). In this example, the thickness of the cover layers was set to be about 6 μm.

Heat Storage Material of Comparative Example 1

In the same manner as the above Example 1, a mixed liquid having hexadecane (phase change material) solved in a sodium salt water solution of styrene anhydride copolymer was prepared, and the mixed liquid was then added to an initial melamine-formaldehyde condensation product solution so as to be emulsified, so that a number of capsules each having hexadecane covered by an outer shell made of melamine resin were obtained. As a binder, phenol resin was added to the capsules and mixed therewith. The mixture was then extruded into a continuous cylindrical shape and was thereafter cut and dried to obtain granules (cylindrical granules) each having a diameter of about 2 mm and a length of about 1 to 5 mm. The obtained granules were used as a heat storage material of Comparative Example 1.

The heat storage material of Comparative Example 1 was not covered by cover layers and the capsules are exposed to the outside due to small gaps produced between the capsules (see FIG. 2(b)).

(Immersion Tests)

Figure 3:
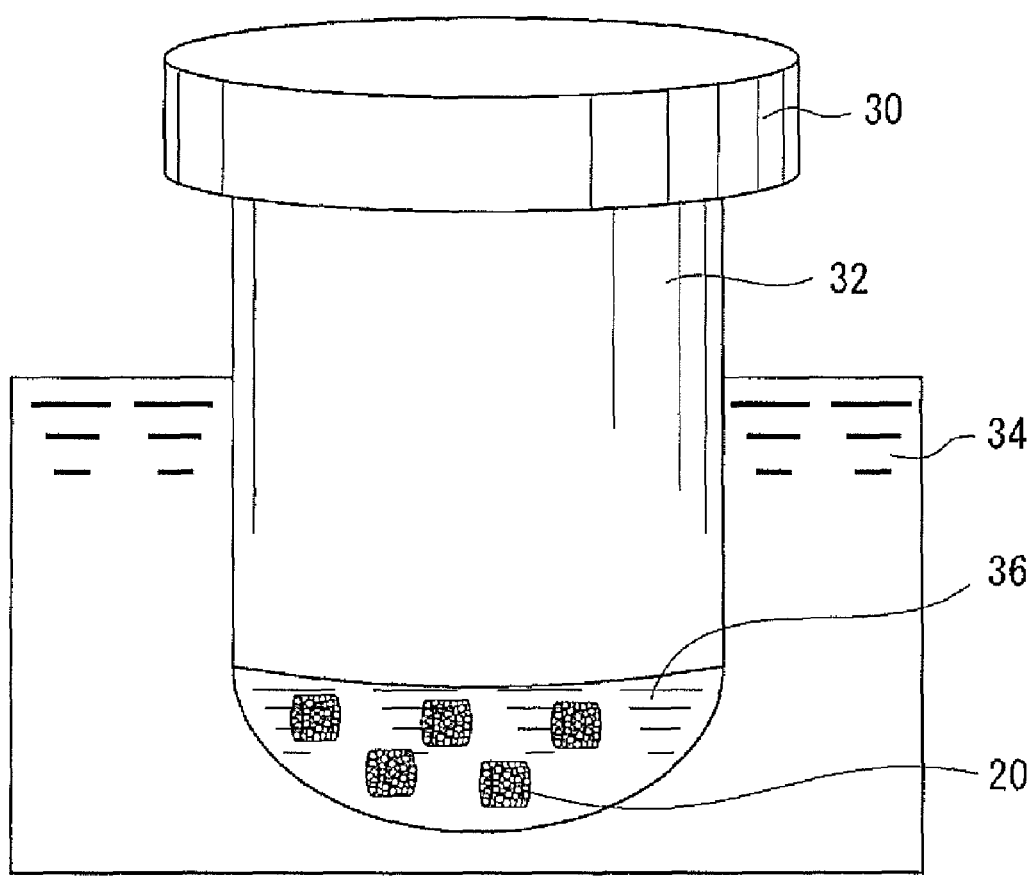
FIG. 3 is a schematic view showing a test apparatus used for measuring heat retaining rate of heat storage materials of Example 1 and Comparative Example.

Immersion tests were conducted to the heat storage materials of Example 1 and Comparative Example 1 by using a pressure resistant bottle 32 and an oil vessel 34 shown in FIG. 3. During the immersion tests, the pressure resistant bottle 32 was sealingly closed by a cover 30 and was then immersed into the oil vessel 34 that contains oil having a temperature of 65° C., so that the temperature within the pressure resistant bottle 32 was maintained to be constant.

For the immersion test, gasoline fuel 36 containing 30% of ethanol and a small amount of impurities was filled into the pressure resistance bottle 32. Thereafter, the heat storage material of Example 1 (labeled with the same reference numeral 20 as the heat storage material of the above described embodiment) was put into the gasoline fuel 36 so as to be immersed therewithin. Then, the heat storage material 20 was kept to be immersed into the gasoline fuel 36 for a predetermined period of time. The amount of latent heat produced by the heat storage material 20 (i.e., the heat produced when the heat storage material 20 changes from a liquid phase to a solid phase) of Example 1 was measured every hour after immersion by using a differential scanning calorimeter (Model SSC/5200 DSC220C manufactured by Seiko Instruments Inc.). Thereafter, based on the measured amount of the latent heat, a latent heat retention rate was calculated by the following expression for every hour after immersion:

"Latent Heat Retention Rate (%)=(Amount of Latent Heat after Immersion/Amount of Latent Heat before Immersion)*100"

In the same manner as the measurement conducted for the heat storage material of Example 1, the heat storage material of Comparative Example 1 was immersed into the gasoline fuel 36 and the immersed state was kept during a predetermined period of time for calculation of the latent heat retention rate for every hour after immersion.

(Result of Tests)

Figure 4:
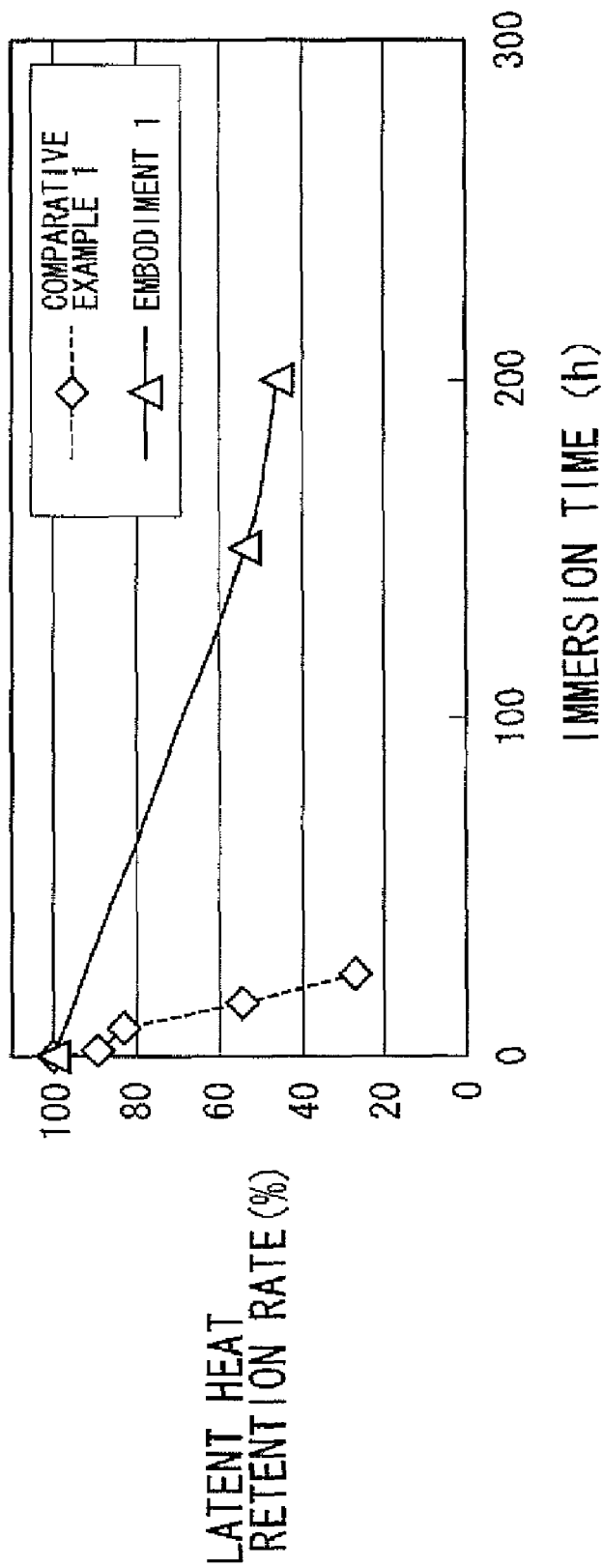
FIG. 4 is a graph showing the test result.

Referring to FIG. 4, the results of calculations of the heat retention rate for Example 1 and that for Comparative Example 1 are shown. The results of calculations of the heat retention rate for Example 1 indicated that the heat retention rate does not remarkably fall even at the immersion time of 200 hours. This may mean that outflow of hexadecane (phase change material) due to the alcohol is inhibited by the cover layers of phenol resin (alcohol resistance resin) during immersion for a long time. Therefore, the adsorption and desorption performances of the heat storage material can be maintained at practically usable levels during a long time use.

More specifically, it could be found that the heat storage material of Example 1 can maintain an excellent latent heat retention rate when immersed into the gasoline fuel 36 that contains 30% of ethanol and impurities. Therefore, the heat storage material of Example 1 can be optimally used for various kinds of currently used alcohol containing fuels (typically containing 1 to 20 vol % of alcohol content) or for alcohol containing fuels that also contain impurities.

On the contrary, the results of calculations of the heat retention rate for Comparative Example 1 indicated that the heat retention rate remarkably falls within 30 hours after immersion. This may mean that the alcohol content of the gasoline fuel 36 entered the heat storage material (i.e., the exposed capsules) to cause outflow of hexadecane (phase change material). In addition, this may mean that the impurities (mainly made of organic acid or peroxide) contained within the gasoline fuel 36 cut the outer shells of the capsules (i.e., cross-link of melamine resin) to broaden the distance between the cross-linked molecules, resulting in that the alcohol content could easily enter the capsules. Therefore, it could be found that the heat storage material of Comparative Example is not suitable for use with alcohol containing fuel because of outflow of the phase change material, which may be caused by the alcohol vapor. However, this analysis is based on only assumption, and therefore, the description in this paragraph is not intend to exclude the use of Comparative Example from the present invention.

The present invention may not be limited to the above embodiment but may be modified in various ways. The followings are some of possible modifications of the above embodiment:

(1) Although activated carbon is used as the adsorption material 10 of the above embodiment, it is possible to use any other materials as long as they can adsorb the fuel content (such as butane having a molecular size of 4.2 Å to 5.0 Å) of the fuel vapor. For example, a porous material made of zeolite or polyimide can be used as the adsorption material 10. In addition, the adsorption material 10 is preferably made of material that may not adsorb the air content (such as nitrogen having a molecular size of less than 4.0 Å and oxygen having a molecular size of 3.8 Å) that is smaller in molecular diameter than the fuel content. Further, although the adsorption material 10 is in forms of cylindrical granules, the adsorption material 10 may be in a form of powder.

(2) Alcohol-containing fuels usable for this embodiment may include a fuel containing bioethanol derived from plants, such as sugarcanes and corns, and a fuel containing chemically synthesized ethanol. In addition, although the canister 2 of this embodiment can be suitably used for alcohol containing fuels, the canister 2 can be also suitably used for normal gasoline fuels.

(3) Further, although the housing 4 of the canister 2 is configured to define a single storage space, a substantially U-shaped partition wall may be disposed to separate the space within the housing 3 into a first adsorption chamber and a second adsorption chamber. In such a case, the evaporation line EL and the purge line PL may communicate with the first chamber, and the atmospheric line AL may communicate with the second chamber. With this arrangement, a long flow path for the flow of the fuel vapor can be ensured within the canister 2, so that it is possible to reliably adsorb the fuel vapor. In addition, although the purge line PL is directly connected to the fuel tank (8) in the above embodiment, the purge line PL may be indirectly connected to the fuel tank via a pipeline that is connected to the fuel tank. Further, the control of flow of the fuel vapor flowing through the lines may be performed by a pump and valves (not shown) provided on the vehicle or may be performed by using a negative pressure that may be produced within the fuel tank or the like.

(4) Further, although the canister 2 is provided in a single number at a midpoint of a path communicating between the fuel tank (8) and the outside (6) in the above embodiment, a plurality of canisters may be provided at the midpoint of the path communicating between the fuel tank (8) and the outside (6). For example, a sub-canister may be disposed on an upstream side of the canister 2 and a heat storage material same as the heat storage material 20 of the above embodiment may be disposed within the sub-canister, so that it is possible to further effectively adsorb the fuel vapor (alcohol vapor).

(5) Furthermore, although the canister 2 of this embodiment is installed on the vehicle that can run on alcohol containing fuel, the canister 2 can also may be installed on a vehicle that can run on electricity in addition to alcohol containing fuel (i.e., a hybrid vehicle). In the case of the hybrid vehicle, fuel vapor (alcohol vapor) produced in a fuel tank may be introduced into the canister 2, where the fuel content, such as butane, of the fuel vapor is adsorbed, and the air content of the fuel vapor may then be discharged to the outside during running on electricity (during stopping of an internal combustion engine of the vehicle).

This invention claims:

1. A canister comprising:
an adsorption material capable of adsorbing a fuel vapor; and
a heat storage material containing a phase change material capable of absorbing and dissipating a latent heat in response to change in temperature; wherein:
the heat storage material comprises a plurality of capsules each sealingly containing the phase change material, the capsules are mixed with a binder and are granulated into a plurality of granule bodies;
each of the granule bodies is covered by a cover layer made of an alcohol resistance resin;
the binder is made of a phenol resin and a mixing rate of the binder is 1 to 10% by weight of the total weight of the capsules; and
the alcohol resistance resin is made of a phenol resin and a rate of the cover layers is 1 to 10% by weight of the total weight of the granule bodies.

2. The canister as in claim 1, each of the granule bodies includes an intermediate layer made of poly vinyl alcohol and provided between each of the granule bodies and the cover layer thereof.

3. The canister as in claim 1, wherein the mixing rate of the binder is 4% by weight of the total weight of the capsules, and the rate of the cover layers is 3% by weight of the total weight of the granule bodies.

4. The canister as in claim 2, wherein the mixing rate of the binder is 4% by weight of the total weight of the capsules, and the rate of the cover layer is 3% by weight of the total weight of the granule bodies.

5. A canister comprising:
a housing; and
an adsorption material and a heat storage material disposed within the housing, wherein:
the adsorption material can adsorb a fuel vapor;
the heat storage material can absorb and dissipate a heat in response to change in temperature within the housing;
the heat storage material comprises a plurality of heat storage granules each having a cover layer made of an alcohol resistance resin;
each of the heat storage granules includes a granule body;
the cover layer is formed on the granule body; and
the granule body comprises a plurality of capsules bonded together by a binder and each containing a phase change material that can change in phase between a liquid phase and a solid phase in response to change in temperature.

6. The canister as in claim 5, wherein the cover layer is made of a phenol resin.

7. The canister as in claim 6, wherein the cover layer has a thickness of between 0.5 μm and 15 μm.

8. The canister as in claim 5, wherein the rate of the cover layers is 1 to 10% by weight of the total weight of the granule bodies.

9. The canister as in claim 5, wherein:
the adsorption material comprises a plurality of adsorption granules; and
the adsorption granules are mixed with the heat storage granules.

10. The canister as in claim 9, wherein the rate of the heat storage material is 5 to 40% by weight of the total weight of the heat storage material and the adsorption material.

11. A canister comprising:
a housing; and
an adsorption material and a heat storage material disposed within the housing, wherein:
the adsorption material can adsorb a fuel vapor;
the heat storage material can absorb and dissipate a heat in response to change in temperature within the housing;
the heat storage material comprises a plurality of granule bodies each having a cover layer made of an alcohol resistance resin;
each of the granule bodies comprises a plurality of capsules bonded together by a binder, and each of the capsules contains a phase change material that can change in phase between a liquid phase and a solid phase in response to change in temperature.

12. The canister as in claim 11, wherein the cover layer is made of a phenol resin.

13. The canister as in claim 12, wherein the cover layer has a thickness of between 0.5 µm and 15 µm.

14. The canister as in claim 11, wherein the rate of the cover layers is 1 to 10% by weight of the total weight of the granule bodies.

15. The canister as in claim 11, wherein:
the adsorption material comprises a plurality of adsorption granules; and
the adsorption granules are mixed with the heat storage granules.

16. The canister as in claim 15, wherein the rate of the heat storage material is 5 to 40% by weight of the total weight of the heat storage material and the adsorption material.

* * * * *